July 26, 1966     A. WINKLER     3,262,380
AUTOMATIC CAMERA WITH INTERCHANGEABLE OBJECTIVES
Original Filed Sept. 14, 1961     3 Sheets-Sheet 1

INVENTOR.
ALFRED WINKLER
BY
Michael S. Striker
ATTORNEY

INVENTOR.
ALFRED WINKLER
BY
Michael S. Striker
ATTORNEY

United States Patent Office 3,262,380
Patented July 26, 1966

3,262,380
AUTOMATIC CAMERA WITH INTERCHANGEABLE OBJECTIVES
Alfred Winkler, Munich, Germany, assignor to Agfa Aktiengesellschaft, Leverkusen-Bayerwerk, Germany
Continuation of application Ser. No. 138,038, Sept. 14, 1961. This application Apr. 5, 1963, Ser. No. 270,982
Claims priority, application Germany, Sept. 23, 1960, A 35,644
3 Claims. (Cl. 95—10)

The present invention relates to cameras.

More particularly, the present invention relates to cameras which are at least partly automatic and which have interchangeable objectives.

The instant application is a continuation of formerly copending and now abandoned application Serial No. 138,038, filed September 14, 1961, and entitled Automatic Camera With Interchangeable Objectives.

As is well known, the interchangeable objectives which are adapted to be used with certain cameras have different characteristics. Thus, certain objectives may be able to provide a relatively wide opening for the diaphragm while others cannot be opened to the same extent. This situation creates problems when the interchangeable objectives are used with cameras which are set, at least in part, in an automatic way. For example, if the automatic camera-setting structure is capable of automatically providing settings which include a maximum exposure aperture of the diaphragm which is more than $f/2$, then of course if the objectives of such a camera are interchanged so that the new objective can only provide a maximum opening of the diaphragm which is substantially less than $f/2$, it is clear that the automatic structure will be able to provide settings under certain lighting conditions which will not be able to be carried out by the camera.

It is therefore a primary object of the present invention to provide for cameras of the above type a structure which will enable the automatic structure to be adapted to the particular characteristics of the several objectives which may be used interchangeably with the camera.

A further object of the present invention is to provide a structure wherein the correction of the range of the automatic camera-setting structure according to the characteristics of the particular objective takes place in a fully automatic manner so that the operator need not be concerned in any way with the fact that characteristics of the new objectives are different from those of the one which was previously attached to the camera.

Still another object of the present invention is to provide a camera which is operated in part manually and in part automatically with a structure cooperating with the manually operated part of the camera to correct for the particular characteristics of the objective along with the particular preselection made by the manually operated part of the structure so as to obtain a proper exposure with the automatically operated part of the structure.

It is furthermore an object of the present invention to provide a structure capable of accomplishing all of the above objects and at the same time composed of simple rugged elements which are very reliable in operation.

With the above objects in view, the invention includes, in a camera, an automatic means for automatically setting at least part of the structure of the camera which determines the exposure made thereby, this automatic means including a light meter having a movable pointer and a scanning assembly having a scanning edge which is adapted to cooperate with this pointer. An objective is removably attached to the camera and carries a projection which, when the objective is attached to the camera, assumes a location in accordance with the largest exposure aperture which can be provided by the particular objective. A correcting means in the form of a motion transmitting structure is actuated by this projection and cooperates with the automatic means for transmitting movement of the projection, during the attaching of the objective to the camera, to the automatic means and for correcting the position of the scanning edge of the scanning assembly and the pointer of the light meter, one relative to the other, in accordance with the largest exposure aperture which can be provided by the diaphragm of the particular objective which has been attached to the camera.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
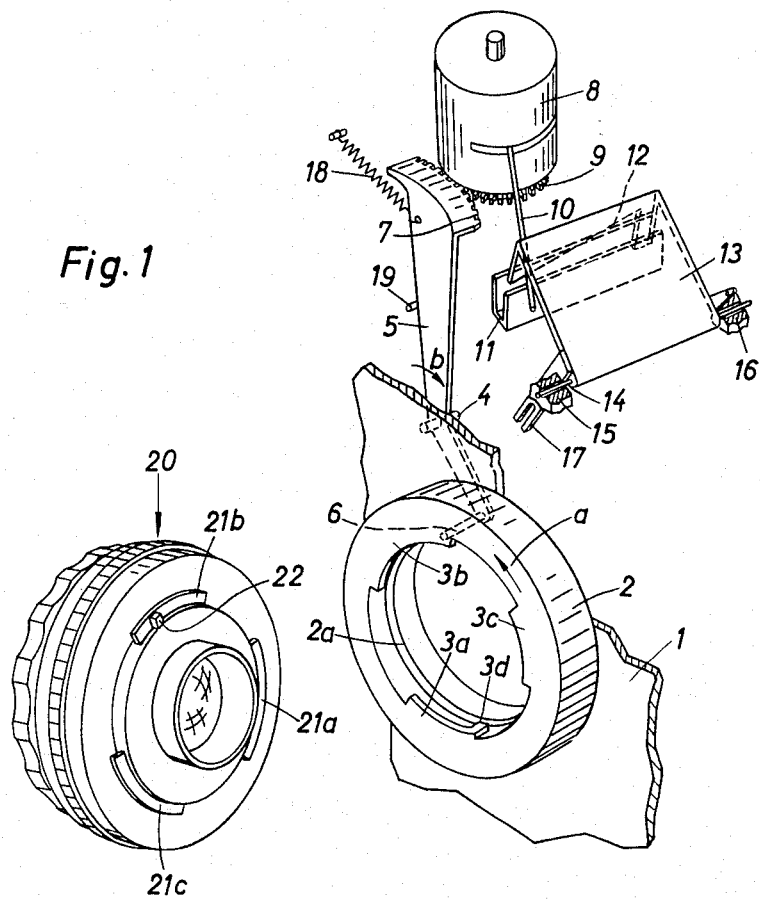
FIG. 1 is a fragmentary perspective illustration of one possible structure according to the present invention, FIG. 1 showing only that part of the camera which includes the structure of the invention, and FIG. 1 also shows adjacent the camera a removable objective as it appears from the rear at the part thereof which is fastened to the camera.

Referring now to FIG. 1, there is fragmentarily illustrated therein the front wall 1 of a camera, this front wall 1 fixedly carrying a bayonet ring 2 provided with the bayonet projections 3a, 3b, and 3c. The size and arrangement of these bayonet projections are such that spaces of unequal angular length remain between these projections, so that the interchangeable objectives which the bayonet ring 2 receives can be introduced only with their bayonet projections in a predetermined angular position between the bayonet projections of the ring 2. The wall 1 fixedly carries a pivot pin 4 which serves to pivotally support a two-armed lever 5 which forms a transmission of a correcting means for correcting or adapting the automatic means to the particular objective. The lower end of the lever 5 fixedly carries a pin 6 extending parallel to the optical axis into the space surrounded by the ring 2, this pin 6 extending to a point between the bayonet projection 3b and an annular surface 2a which is directed forwardly and which defines with the bayonet projections 3a–3c a groove to receive the bayonet projections of the objective, these latter projections engaging surface 2a when the objective is attached to the camera. Pin 6 extends through an unillustrated cutout of ring 2, this cutout being large enough to provide the required free movement of pin 6. The other end of the lever 5 fixedly carries a gear sector 7 whose center is in the axis of the pivot pin 4, and this gear sector 7 meshes with a gear 9 which is fixed coaxially to a light meter 8 which is supported by a suitable unillustrated bearing for rotary movement about its axis.

The light meter 8 includes a movable member or pointer 10 which in the rest position of the parts shown in FIG. 1 is free to move over the support 11 of U-shaped cross section having a pair of upper surfaces which are adapted to be engaged by the pointer 10 so as to permit only a limited deflection of the pointer 10 by the scanning means described below. The scanning or sensing means includes the angled plate or sensing member 13 one wall of which is formed with the scanning edge 12. The plate 13 may be fixed to the elongated pivot pin 14 which is supported for rotary movement by the stationary bearings 15 and 16, and the wall of the plate 13 which has the scanning edge 12 can turn freely into and out of the space between the walls of the support 11 during approach of the scanning edge 12 towards and movement of this edge away from the pointer 10, as is well known in the art. The plate 13 fixedly carries a projection 17 which is bifurcated so as to be coupled with a pin which is fixed to a structure for setting part of the camera which determines the exposure made thereby. For example, the turning of the plate 13 may be transmitted by way of the projection 17 to the structure of the camera which sets the exposure aperture thereof.

A spring 18 is connected at one end to the lever 5 and at its opposite end to a stationary part of the camera, and this spring 18 urges the lever 5 to turn toward the stop pin 19 which is fixedly carried by a stationary part of the camera and which limits the turning of the lever 5 by the spring 18.

The objective 20 which is shown in FIG. 1 is one of a plurality of objectives which can be interchangeably connected with the camera, and the objective 20 is provided at its rear with three bayonet projections 21a–21c which are adapted to cooperate with the projections 3a–3c for releasably fastening the objective 20 to the camera. The length and spacing of the projections 21a–21c corresponds to the length and arrangement of the spaces between the bayonet projections 3a–3c so that the objective 20 can be applied to the bayonet ring 2 in only one angular position. When the bayonet projections 21a–21c are introduced in this way into the spaces between the bayonet projections 3a–3c, the objective 20 is turned in direction of the arrow a shown in FIG. 1, and now the bayonet projections 21a–21c will respectively move behind the bayonet projections 3a–3c, and this turning will continue until the leading end of the bayonet projection 21a engages the stop portion 3d of the bayonet projection 3a. Of course, the bayonet projection 21b will simultaneously become located behind the bayonet projections 3b, and in accordance with the present invention the objective 20 is provided with a positioning means formed by a projection 22 which projects from the bayonet projection 21b in the illustrated example. The location of this projection 22 of the objective 20 is in accordance with the largest exposure aperture which can be provided with the diaphragm of the objective 20. When the lever 5 is in the rest position illustrated in FIG. 1, the pin 6 which is fixed to the lever 5 is located in the path of turning movement of the projection 22 during attaching of the objective 20 to the camera, which is to say during turning of the objective 20 with respect to the bayonet ring 2 in the direction of the arrow a of FIG. 1. As was indicated above the scanning plate 13 by way of its portion 17 is connected to a pin of a ring which turns during turning of the scanning plate 13 and this ring serves to set automatically part of the structure of the camera which determines the exposure made thereby. The objective 20 includes a diaphragm-adjusting ring which, when the objective 20 is attached to the camera, becomes automatically coupled with the ring which is turned by the projection 17, so that in this way the turning of the scanning plate 13 will result in automatic adjustment of the diaphragm. The structure for coupling the diaphragm-adjusting ring of the objective 20 to the ring which is turned by the projection 17 is well known in the art, as exemplified by U.S. Patent 3,115,077.

During attaching of the objective 20 to the camera by way of the bayonet ring 2, the projection 22 by engagement with the pin 6 turns the lever 5 in opposition to the spring 18 in the direction of the arrow b, and in this way the sector 7 turns so as to turn the gear 9 and the light meter 8 therewith. Thus, the position of the light meter pointer 10 with respect to the scanning assembly, and in particular its scanning edge 12, is changed in accordance with the largest exposure aperture which can be provided by the objective 20. In other words, for a given set of lighting conditions the position of the pointer 10 relative to the edge 12 has been changed in this way so as to correct for the largest possible aperture which can be provided by the objective. Thus, it will be seen that the structure of the invention provides a transmission which corrects the position of the pointer 10 relative to the scanning edge 12 for the purpose of adapting the automatic means to the characteristics of the particular objective which is removably attached to the camera.

In order to remove the objective 20 it is simply turned in a direction opposite to that indicated by the arrow a until the bayonet projections 21a–21c become aligned with the spaces between the bayonet projections 3a–3c, and then the objective 20 is simply moved forwardly away from the bayonet ring 2. At this time the spring 18 will turn the lever 5 until it engages the stop pin 19, and thus the parts will return to the position indicated in FIG. 1. Of course, during this turning of the lever 5 the gear sector 7 will cooperate with the gear 9 so as to turn the entire light meter 8 back to the position indicated in FIG. 1.

With a different objective which has a different maximum exposure aperture, the position of the projection 22 is changed so that when the objective is attached to the camera in the manner described above the projection will cooperate with the pin 6 to turn the lever 5 to an angle which will position the light meter pointer 10 with respect to the scanning edge 12 in a position corresponding to the largest exposure aperture which can be provided by the objective. Thus, this second objective may turn the lever 5 through a greater or a lesser angle than the angle through which it is turned by the particular objective which is illustrated in FIG. 1.

Figure 2:
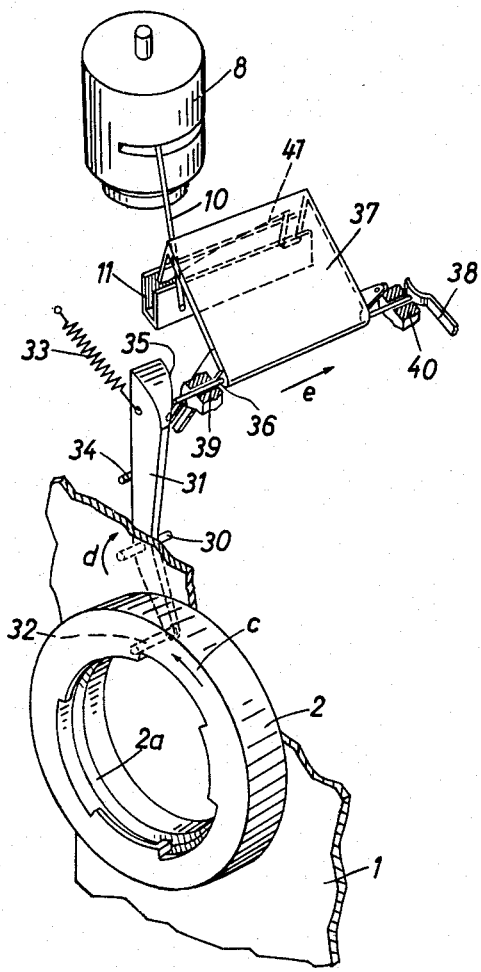
FIG. 2 is a fragmentary perspective illustration of another embodiment of a structure according to the present invention.

As has been indicated above, with the structure of the invention the light meter pointer and scanning edge of the automatic means are automatically adjusted one relative to the other in order to compensate for the particular characteristics of the objective. In the particular example shown in FIG. 1, it is the light meter pointer which is moved relative to the scanning edge 12, but it is also possible to provide the necessary corrections by shifting the scanning edge with respect to the light meter pointer, and such construction is illustrated in FIG. 2. Thus, the front wall 1 of the camera of FIG. 2 fixedly carries a pivot 30 which serves to pivotally support an elongated lever 31 one end of which fixedly carries, as described above in connection with FIG. 1, an elongated pin 32 extending parallel to the optical axis up to the space between surface 2a and the rear of the bayonet projections of the bayonet ring 2. A spring 34 cooperates with the lever 31 to urge it toward and into engagement with the stop 34. The end portion of the lever 31 which is distant from the pin 32 forms a cam 35 whose camming surface is directed toward the rear of the camera. With this construction the scanning plate 37 is fixedly carried by the pivot pin 36 which is supported not only for turning movement by the stationary bearings 39 and 40 but which can also shift axially, and one end of the pin 36 is maintained in engagement with the cam 35 by the spring 38 which engages the opposite end of the pin 36 this spring 38, being, for example, in the form of a leaf spring fixedly carried at its end distant from the pivot pin 36 by any suitable stationary part of the camera. The angled scanning plate 37 has a wall formed with the scanning edge 41 which cooperates with the pointer 10 of the light meter 8 in the manner described above, and the space between the bearings 39 and 40 is sufficiently greater than the width of the scanning plate 37 so as to provide for the necessary degree of movement of the scanning plate 37 in the direction of the arrow $e$ or in the opposite direction. Thus, with this embodiment whenever the objective is attached to the camera the projection, such as the projection 22 of FIG. 1, cooperates with the pin 32 to turn the lever 31 and to cause the camming surface 35 to cooperate with the pin 36 so as to shift the scanning plate 37 to a position with respect to the pointer 10 which will provide for a correction in accordance with the particular characteristics of the objective, and thus with this embodiment it is the scanning edge 41 which is moved relative to the pointer 10. Of course, instead of moving the entire scanning plate 37, the scanning plate may have connected thereto, for longitudinal movement, a separate plate provided with the scanning edge 41, and a separate plate which is supported for longitudinal movement with respect to the remainder of the scanning assembly may be longitudinally shifted by an arrangement such as that of FIG. 2 in order to take care of the particular characteristics of the objective which is attached to the camera.

Thus, when the objective is attached to the camera according to FIG. 2, the objective is turned in the direction of the arrow $c$, and the projection of the objective will cooperate with the pin 32 so as to turn the lever 31 in the direction of the arrow $d$. Thus, the cam 35 will move with respect to the pin 36 so as to shift the pin 36 in the direction of arrow $c$ or in the opposite direction so as to adjust the position of edge 47 relative to pointer 10 as required by the particular objective.

Figure 3:
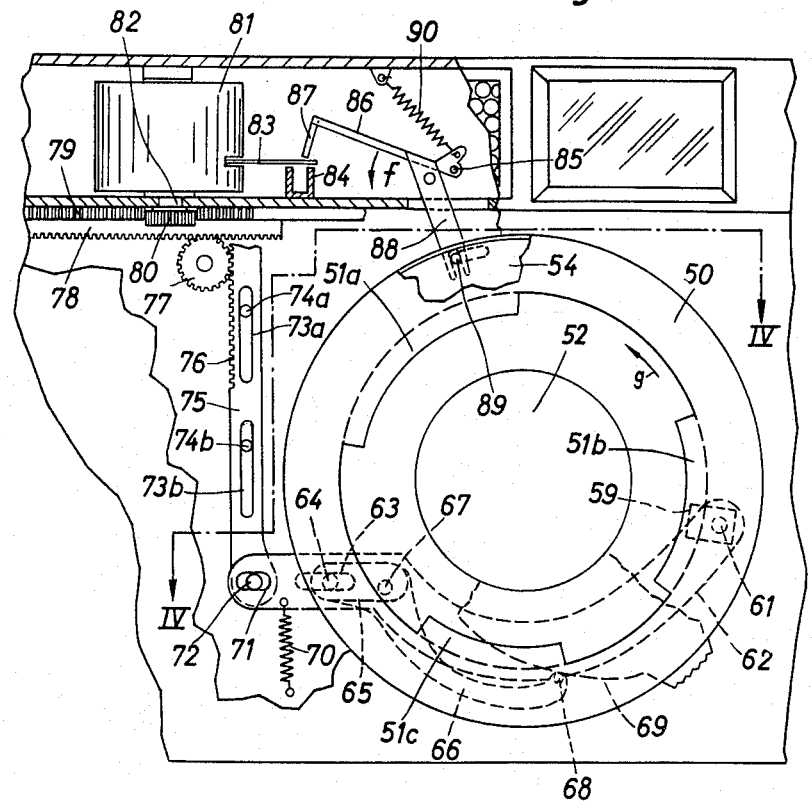
FIG. 3 is a fragmentary illustration of a third embodiment of a structure according to the present invention.
Figure 4:
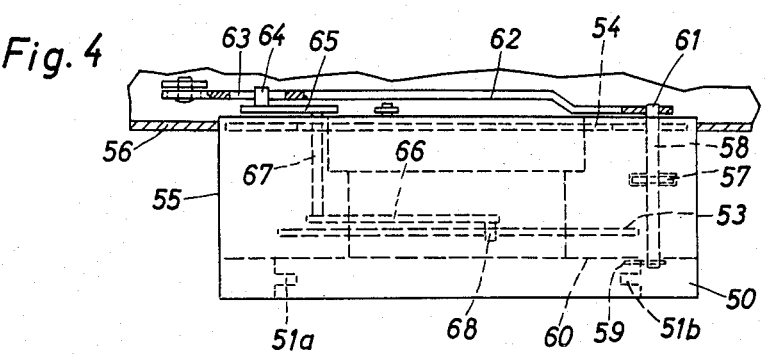
FIG. 4 is a sectional plan view taken along line IV—IV of FIG. 3 in the direction of the arrows.

According to the embodiment of the invention which is illustrated in FIGS. 3 and 4, the camera includes a bayonet ring 50 having bayonet projections 51$a$, 51$b$, and 51$c$, these projections being arranged along a circle which is concentric with a central opening through which light can enter into the camera. Behind the bayonet ring 50 are located rotary elements 53 and 54 for respectively setting the exposure time and the exposure aperture, and these elements 53 and 54 are turnable about the optical axis. The camera adjusting elements 53 and 54 are located within a stationary tube 55 which on the one hand is fixed to the front wall 56 in the camera and which carries at its front end the bayonet ring 50. Within the tube 55 is arranged a stationary pivot pin 57 which extends perpendicularly to the optical axis, and a lever 58 is pivotally supported intermediate its ends on this pivot pin 57. At its front end the lever 58 fixedly carries a projection 59 adapted to be engaged by the projection of the interchangeable objective, this latter projection corresponding to the projection 22 shown in FIG. 1 and having a location in accordance with the largest exposure aperture which can be provided by the objective, and in order to cooperate properly with the projection of the objective the projection 59 extends into the space between the bayonet projection 51$b$ and the surface 60 located behind the bayonet projections. The end of the lever 58 distant from the projection 59 forms a pivot pin 61 extending into an opening of a lever 62 which is supported, in part, for turning movement by the pivot pin 61. The lever 62 extends around the opening 52 which is formed in the camera wall to allow light to pass therethrough, and this lever 62 is formed with an elongated slot 63. A second pivotal support for the lever 62 is formed by a pin 64 which extends into the slot 63 and which is fixedly carried by a lever 65 which is fixed to an elongated pin 67 supported for rotary movement by any suitable bearing structure and carrying distant from the lever 65 a lever 66 which terminates in a pin 68. This pin 68 bears against the camming edge 69 of the exposure time setting element 53, so that during turning of this latter element the lever 65–67 will turn about the axis of the pin 67 so as to change the location of the pivot pin 64.

A spring 70 is fixed at one end to a stationary part of the camera and at its opposite end to the lever 62 in the manner shown in FIG. 3 for urging the lever 62 about the pivot pin 61 so as to maintain the pin 68 against the camming edge 69 and for urging the lever also about the pivot pin 64 so as to maintain the lever 58 in a predetermined end position. The free end of the lever 62 which is distant from the lever 58 is formed with an elongated slot 71 receiving a pin 72 which is fixed to the lower end of an elongated rack 75 which is guided for vertical movement by a pair of elongated slots 73$a$ and 73$b$ formed in the rack and stationary pins 74$a$ and 74$b$ respectively received in the slots 73$a$ and 73$b$, this rack 75 having the teeth 76.

The teeth 76 of the rack 75 mesh with a rotary pinion 77 which in turn meshes with a rack 78 supported by any suitable guides for horizontal movement to the right and left, as viewed in FIG. 3, and this rack 78 has additional teeth 79 which mesh with a pinion 80 which is fixed to the lower end of a pin 82 which is fixed to the light meter 81, this pin 82 extending through a suitable bearing formed in the upper wall of the camera housing, as indicated in FIG. 3.

The rotary light meter 81 has a pointer 83 which is freely movable over an elongated support member 84 having a U-shaped cross section and having a pair of upper edges which limit the downward deflection of the pointer 83, as is particularly apparent from FIG. 3, and the automatic means of the embodiment of FIG. 3 includes in addition to the light meter the scanning plate 86 which is supported for pivotal movement about the pivot 85 and which has a downwardly directed wall 87 formed with the scanning edge which cooperates with the pointer 83 in the manner described above in connection with the embodiments of FIGS. 1 and 2. The scanning plate 86 which is thus supported for turning movement about the axis of the pivot 85 has an elongated extension 88 fixed thereto and formed with a bifurcated portion receiving a pin 89 which is fixed to the diaphragm-setting ring 54, so that this ring 54 turns in response to turning of the scanning plate 86. A spring 90 is fixed at one end to the plate 86 and at an opposite end to a stationary part of the camera so as to urge the scanning plate 86 to turn in the direction of the arrow $f$ so as to bring the scanning edge into engagement with the pointer 83, and an unillustrated well known manually operable release plunger is provided for releasing the scanning assembly to the force of the spring 90. This manually operable release plunger is urged to a rest position by a return spring which is stronger than the spring 90 so as to maintain the parts in the illustrated rest position.

The objective which may be releasably connected with the camera of FIGS. 3 and 4 has a construction which may be identical with that shown in FIG. 1 and described above. In order to attach this objective to the camera the bayonet projections of the objective are introduced into the spaces between the bayonet projections 51$a$–51$c$, and then the objective is turned in the direction of the arrow $g$ as shown in FIG. 3 so that the bayonet projections of the objective will become located behind the bayonet projections of the bayonet ring 50. At the same time, the projection which corresponds to the projection 22 as shown in FIG. 1 will engage the projection 59 at the front end of the lever 58 so as to turn the lever 58 to an angular position which will be determined by the largest possible exposure aperture which can be provided by the particular objective. The turning of the lever 58 in this manner about its pivot 57 will cause the location of the pivot 61 to change, and the lever 62 at this time will turn about the pivot 64 so as to shift the rack 75 which through the pinion 77 and the racks 78, 79 will turn the gear 80 and the light meter 81 so as to adjust the position of the pointer 83 relative to the scanning edge in accordance with the particular characteristics of the objective.

When the objective is attached to the camera, the diaphragm adjusting ring 54 will become simultaneously coupled in a well known manner with the diaphragm adjusting ring of the objective itself. In order to make an exposure, the exposure time setting element 53 is manually actuated so as to manually provide a preselected exposure time, and this will result in moving of the camming edge 69 so that by cooperation of this camming edge 69 with the pin 68 the lever 65-67 will turn about the axis of the pivot 67 and thus change the position of the pivot 64. The lever 62 will now turn about the pivot 61, and through the transmission 75-80 the light meter 81 will again have its angular position changed so as to regulate the position of the pointer 83 with respect to the scanning edge of the scanning assembly, and in this way the particular exposure time which is manually set into the camera is introduced into the automatic structure so that the exposure aperture which is automatically provided will be in accordance with the particular exposure time chosen by the operator.

In order to make an exposure the operator simply depresses the above-referred to manually operable plunger so as to release the scanning plate 86 to the force of the spring 90 which now turns the plate 86 in the direction of the arrow f until the scanning edge of the element 87 engages the pointer 83. The arm 88 will of course turn also so as to turn the ring 54 and thus automatically set the aperture, and it will be noted that with the structure of the invention this automatic operation is made not only in accordance with the particular maximum exposure aperture which can be provided by the particular objective but also with respect to the exposure time which is manually set into the camera. Of course, in the case where the camera is a single-lens reflex camera, the aperture setting structure sets the position of a stop which limits the turning of a diaphragm setting ring by a spring when the shutter is released, as is well known.

Of course, some of the details described above and shown in the drawings may be changed without departing from the invention. For example, instead of a lever 58 it is possible to provide a rotary ring which carries a projection corresponding to the projection 59 as well as a pivot pin for supporting the lever 62, such a rotary ring also being acted upon by a spring so as to urge its projection toward the projection of the objective which is attached to the camera.

It will be understood that each of the elements described above or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera, in combination, automatic means for determining the position of part of the structure which determines the exposure made by the camera, said automatic means including a light meter having a movable pointer and a scanning assembly having a scanning edge adapted to cooperate with said pointer; manually operable means for actuating another part of the structure of the camera which determines the exposure made thereby; an objective movably carried by the camera and having a projection whose position, when the objective is attached to the camera, is in accordance with the largest exposure aperture which can be made by said objective; and correcting means actuated both by said projection and said manually operable means and cooperating with said automatic means for correcting the position of said light meter pointer and the scanning edge one with respect to the other in accordance with the largest aperture which can be provided by said objective and the manual setting of said other part of said structure by said manually operable means.

2. In a camera, in combination, a lever; a pair of pivots supporting said lever, said lever turning about one of said pivots when the other of said pivots changes its position and said lever turning about said other pivot when said one pivot changes its position; an objective removably attached to the camera and having a projection whose position when the objective is attached to the camera is in accordance with the largest exposure aperture which can be provided by said objective; means actuated by said projection and cooperating with one of said pivots for positioning the latter according to the largest exposure aperture which can be provided by said objective; manually operable means for determining the position of part of the structure which determines the exposure made by the camera, said manually operable means cooperating with the other of said pivots for positioning the latter according to the setting provided by said manually operable means; automatic means for automatically determining the setting of another part of the camera which determines the exposure made thereby, said automatic means including a light meter pointer and a scanning edge of a scanning assembly; and means actuated by said lever and cooperating with said automatic means for positioning said pointer and scanning edge one with respect to the other according to the setting provided by said manually operable means and the position of said projection when said objective is attached to the camera.

3. In a camera, in combination, support means; a pair of levers turnably carried by said support means; a pair of pivot pins respectively carried by said levers to be positioned according to the positions of said levers, respectively; a third lever carried by said pair of pivot pins; an objective removably attached to the camera and having a projection cooperating with one of said pair of levers for turning said one of said pair of levers to a position in accordance with the largest exposure aperture which can be provided by said objective, so as to position correspondingly the pivot pin carried by said one of said pair of levers; manually operable exposure time setting means cooperating with the other of said pair of levers for positioning the latter in accordance with the exposure time manually set into the camera by the operator so as to position the pivot pin carried by said other of said pair of levers according to the exposure time set into the camera, whereby the position of said third lever is indicative of the combination of the largest exposure aperture which can be provided by the objective and the exposure time manually set into the camera; diaphragm setting means; automatic means cooperating with said diaphragm setting means for automatically setting the latter and including a light meter having a movable pointer and a scanning assembly having a scanning edge adapted to cooperate with said pointer; and correcting means actuated by said third lever and cooperating with said automatic means for correcting the position of said scanning edge and light meter pointer relative one to the other according to the combination of the largest exposure aperture of said objective and the exposure time manually set into the camera.

References Cited by the Examiner
UNITED STATES PATENTS
3,082,672  3/1963  Swarofsky _____ 95—10

NORTON ANSHER, *Primary Examiner.*

JOSEPH P. STRIZAK, J. R. BLOOM, C. B. PRICE,
*Assistant Examiners.*